US008970609B2

(12) United States Patent
Frantz (10) Patent No.: US 8,970,609 B2
(45) Date of Patent: Mar. 3, 2015

(54) TEXT-TO-VISUAL SWITCHING AND MAPPING (75) Inventor: Andrew Frantz, Moorestown, NJ (US)

(73) Assignee: Sybase, Inc., Dublin, CA (US)

(*) Notice: Subject to any disclaimer, the term of this patent is extended or adjusted under 35 U.S.C. 154(b) by 728 days.

(21) Appl. No.: 13/234,616

(22) Filed: Sep. 16, 2011

(65) Prior Publication Data
US 2013/0069952 A1 Mar. 21, 2013

(51) Int. Cl.
G06T 1/00 (2006.01)
G06T 11/20 (2006.01)

(52) U.S. Cl.
CPC .................................. G06T 11/206 (2013.01)
USPC ......................................................... 345/522

(58) Field of Classification Search
USPC .................................... 717/104; 707/999.107
See application file for complete search history.

(56) References Cited

U.S. PATENT DOCUMENTS 8,689,173 B2 * 4/2014 Elaasar .......................... 717/104
2008/0263096 A1 * 10/2008 Klein et al. ............. 707/999.107
2009/0138249 A1 * 5/2009 Irassar et al. ...................... 703/6

* cited by examiner

Primary Examiner — Phi Hoang
(74) Attorney, Agent, or Firm — Sterne, Kessler, Goldstein & Fox PLLC (57) ABSTRACT System, methods and computer-readable mediums for generating a visual representation of a continuous computation language (CCL) document. The CCL document includes one or more CCL statements. For each CCL statement, a text-to-visual mapping module converts each CCL statements to visual objects as a representation of instruction logic of the CCL document graphically on a display device.

18 Claims, 6 Drawing Sheets

FIG. 1

```
                                              Textual Editor 122
202A — CREATE MEMORY STORE MemoryStore PROPERTIES INDEXTYPE= 'TREE',INDEXSIZEHINT=8;
204A — CREATE SCHEMA NewSchema (COL1 STRING, COL2 BOOLEAN, COL3 integer);
206A — CREATE INPUT WINDOW InputWindow1 SCHEMA NewSchema    PRIMARY KEY (COL1) STORE MemoryStore;
208A — CREATE INPUT STREAM InputStream1 SCHEMA NewSchema;

210A — CREATE OUTPUT WINDOW OutputWindow1 SCHEMA NewSchema PRIMARY KEY (COL1) AS SELECT * FROM InputWindow1;
212A — CREATE OUTPUT DELTA STREAM Delta1 SCHEMA NewSchema PRIMARY KEY DEDUCED AS SELECT * FROM InputWindow1;

214A — CREATE FLEX Flex1
          in InputWindow1
          out output window flexwindow101
          SCHEMA NewSchema PRIMARY KEY (COL1)
          BEGIN
             ON InputWindow
             {

};
          END
       ;
216A — CREATE OUTPUT STREAM OutputStream1 SCHEMA NewSCHEMA AS SELECT * FROM InputStream1;

218A — ATTACH INPUT ADAPTER RandomTupleAdapter TYPE randomtuplegen_in TO InputStream1 PROPERTIES Rate =100;
```

Textual Editor 122

```
202C—  CREATE MODULE MyTemplateModule
           IN Input1
             OUT Output1
             BEGIN
                 CREATE SCHEMA MySchema (Id integer, Symbol String, TradeTime
         String, Price float, Shares integer, Corr integer);
                 CREATE INPUT WINDOW Input1 SCHEMA MySchema PRIMARY KEY (Id);
                 CREATE OUTPUT WINDOW Output1 PRIMARY KEY DEDUCED AS SELECT *
         FROM Input;

END;

CREATE SCHEMA MyExportedSchema (Id integer, Symbol String, TradeTime
         String, Price float, Shares integer, Corr integer);
         CREATE INPUT WINDOW Trades SCHEMA (MyExportedSchema PRIMARY KEY (Id);
         CREATE OUTPUT WINDOW Output1 SCHEMA MyExportedSchema PRIMARY KEY DEDUCED
         AS SELECT * FROM Trades;

204C—         LOAD MODULE MyTemplateModule AS LM1
                   IN Input1=Trades
                   OUT Output1=ExportedOutput;
```

TEXT-TO-VISUAL SWITCHING AND MAPPING

BACKGROUND OF THE INVENTION

1. Field of the Invention

The invention relates generally to the development of instruction logic for complex event processing (CEP) systems, and more specifically to generating visual objects from continuous computation language (CCL) statements.

2. Description of the Background Art

A complex event processing (CEP) system enables rapid application development by allowing a developer to build and deploy new applications that receive real-time, streaming data. The CEP system responds to the changing conditions resulting from the real-time data and produces a streaming result which is provided to the users or multiple external applications.

A conventional CEP system includes a CEP editor. The CEP editor allows a system developer to generate continuous computational language (CCL) statements that include application logic. However, the conventional CEP editor lacks a text-to-visual module that converts the textual CCL statements into a visual format.

Therefore, what is needed are systems, methods and computer program products that generate a visual representation from the CCL statements.

BRIEF SUMMARY OF THE INVENTION

Embodiments of the invention include systems, methods and computer-readable mediums for generating a visual representation of a continuous computation language (CCL) document. The CCL document includes one or more CCL statements. For each CCL statement, a text-to-visual mapping module converts each CCL statements to visual objects as a representation of instruction logic of the CCL document graphically on a display device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Figure 1:
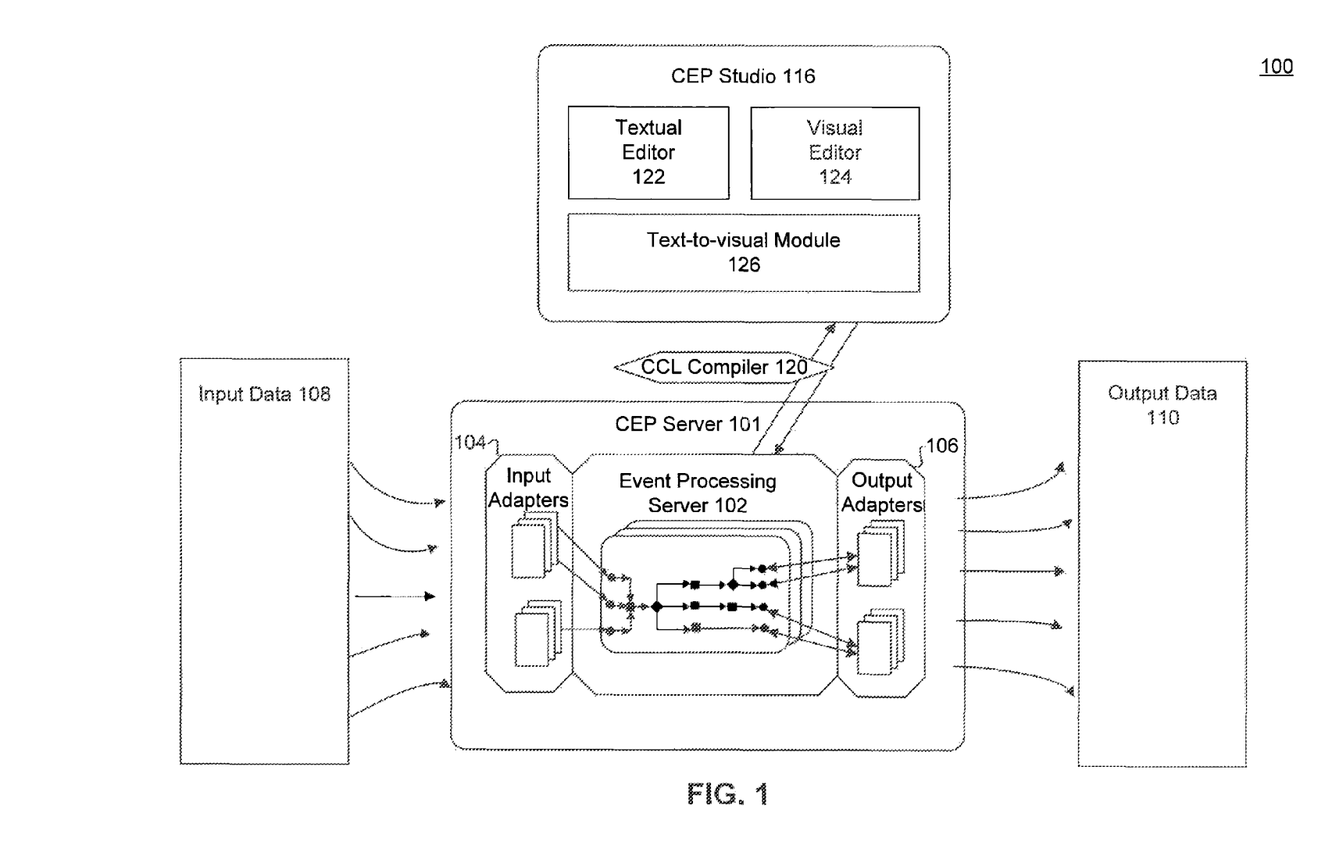
FIG. 1 is a block diagram of an exemplary complex event processing (CEP) system.

FIG. 1 is a block diagram 100 of a complex event processing (CEP) server. CEP server 101 processes hundreds of thousands of messages per second (or more) with latency measured in milliseconds. CEP server 101 may execute on a single processor or on a distributed system that includes multiple processors. Such distributed systems may include multiple machines, each of which includes one or more processors. CEP server 101 may be configured to perform distributed statement processing on one or more processes, parallel statement processing, clustering and automatic fail over to another CEP server 101 when another CEP server 101 fails.

CEP Server 101 processes data streams that include real-time data against instructions written in a continuous computation language (CCL). CEP Server 101 includes event processing server 102, input adapters 104 and output adapters 106. The real-time data generally flows from, for example dynamic or static external sources as input data 108 and enter CEP Server 101 though input adapters 104.

Input adapter 104 translates input data 108 from external sources into a CEP data format that is compatible with CEP server 101. After input adapter 104 translates input data 108 into the CEP data format, input adapter 104 propagates data to event processing server 102. A person skilled in the art will appreciate that input adapter 104 may be configured to translate input data 108 from multiple different formats into a CEP data format.

Event processing server 102 receives real-time data streams in the CEP data format from input adapters 104. Event processing server 102 processes these data streams according to the CCL logic stored in CEP server 101. The CCL logic is embodied in the compiled CCL statements provided by a developer. For example, a developer may use a CEP Studio 116 to generate CCL statements. Once processed, event processing server 102 provides the processed data streams to output adapters 106.

Output adapters 106 translate the CEP data processed by event processing server 102 from the CEP data format to output data 110. Output data 110 is in a format compatible with the external sources and applications. A person skilled in the art will appreciate that output data 110 may be in a format (or formats) expected by the external applications.

Some examples of external sources that provide input data 108 and receive output data 110 may include real-time data feed devices, messaging systems, radio frequency identification (RFID) readers, email servers and relational databases, although the invention is not limited to those examples.

Event processing server 102 processes CEP data as objects that may be, but are not limited to, data streams and windows. Data streams are basic components for transmitting real-time data within event processing server 102. Event processing server 102 receives CEP data from input adapters 104 in a form of a CEP data stream and executes CCL statements on the CEP data stream. Event processing server 102 then transforms the executed CEP data into another CEP data stream that may be processed using other CCP statements, until it is received by output adapter 106.

Windows are collections of rows that include data from the CEP data streams. Windows may be similar to the database tables. Event processing server 102 may aggregate the CEP data included in data stream in one or more windows. CCL statements may also execute instructions on the CEP data aggregated in the windows.

CEP server 101 operates on streams and windows using CCL statements. CCL statements are instructions that use the CEP data from one or more real-time data streams as an input. CCL statements analyze and manipulate the CEP data using logic configured by an application developer and generate an output which may be another CEP data stream or a window. CCL statements execute continuously and may be executed thousands of times by event processing server 102. For example, each time the real-time data arrives at event processing server 102, event processing server 102 executes a CCL statement on the real-time data.

In an embodiment, syntax of the CCL statement may be based on a sequential query language (SQL) which may be used to manipulate relational databases and is known to a person skilled in the relevant art.

Generating a Visual Representation for a CCL Document

In an embodiment, a developer uses CEP studio 116 to construct CCL statements. Once constructed, CCL compiler 120 compiles the CCL statements into executable CCL objects. In one embodiment, a developer may invoke CCL compiler 120 through CEP studio 116. In another embodiment, a developer may invoke CCL compiler 120 from a command line or through an application programming interface (API) on a computing device.

CEP studio 116 includes a textual editor 122 and a visual editor 124. A developer uses text editor 122 to enter and edit CCL statement text, define CEP data streams, describe schemas that set the format for the CEP data streams and windows, connect input and output adapters to the streams, and stream application parameters.

Figure 2A:
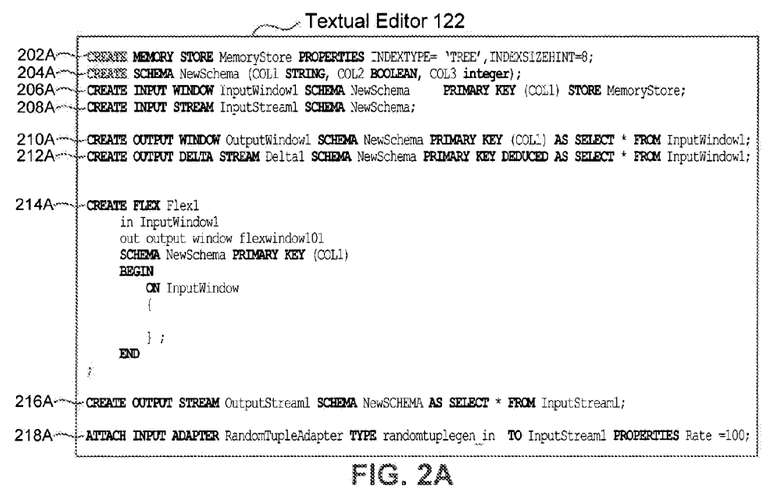
FIG. 2A is a block diagram of an exemplary textual editor.

FIG. 2A is a block diagram 200A of textual editor 122, according to an embodiment. Textual editor 122 is an editor that allows a developer to create and edit a CCL statement and store multiple CCL statements in a CCL document. Each CCL statement may create an objects such as schemas, data stores, data streams, windows, modules, and input adapters and output adapters, to name only a few.

Example CCL document that includes CCL statements is displayed in FIG. 2A. Each CCL statement in FIG. 2A includes a corresponding representation of an object as a node in FIG. 2B, described in detail below.

For example, a non-limiting CCL statement is CCL statement 202A, replicated below:

```
CREATE MEMORY STORE MemoryStore Properties
INDEXTYPE='TREE", INDEXSIZEHINT=8;
```

CCL statement 210A creates a "MemoryStore" object of type STORE. A STORE object stores data that it receives from other objects, such as streams or windows within event processing server 102. A person skilled in the art will appreciate that a STORE object may be analogous to a data repository, such as a database.

Another example non-limiting CCL statement is CCL statement 204A, replicated below:

```
CREATE SCHEMA NewSchema (COL1 STRING, COL2 BOOLEAN,
COL3 INTEGER);
```

CCL statement 204A creates a "NewSchema" object that includes three columns. Each column in the "NewSchema" object includes a data of type string, a data of type boolean and a data of type integer.

Another example non-limiting CCL statement is CCL statement 206A, replicated below:

```
CREATE INPUT WINDOW InputWindow1 SCHEMA
  NewSchema PRIMARY KEY (COL1) STORE MemoryStore;
```

CCL statement 206A creates an "InputWindow1" object of type WINDOW. "InputWindow1" object serves as a data input to other objects, such as "Delta1" and "Flex1" described below. The "InputWindow1" object includes child nodes of type "NewSchema" that store data in a format defined in the "NewSchema" object. "InputWindow1" also provides data for storage in the "MemoryStore" object described above.

Another example non-limiting CCL statement is CCL statement 208A, replicated below:
CREATE INPUT STREAM InputStream1, SCHEMA NewSchema;
CCL statement 208A creates an "InputStream1" object of type STREAM that serves as an input to other objects, as described below. The "InputStream1" object is a data stream that includes three data types defined in the "NewSchema" object, as described herein.

Another example non-limiting CCL statement is CCL statement 210A, replicated below:

```
CREATE OUTPUT WINDOW OutputWindow1 SCHEMA
  NewSchema PRIMARY KEY (COL1) AS SELECT * FROM
  InputWindow1;
```

CCL statement 210A creates an "OutputWindow1" object of type WINDOW. The "OutputWindow1" object receives data from the "InputWindow1" using the SELECT clause above. The declaration SCHEMA in CCL statement 210A indicates that the data is retrieved as the "NewSchema" object with the primary key set on the first column (COL1).

Another example non-limiting CCL statement is CCL statement 212A:

```
CREATE OUTPUT DELTA STREAM Delta1 SCHEMA
  NewSchema PRIMARY DEDUCED AS SELECT * FROM
  InputWindow1;
```

CCL statement 212A creates an output stream "Delta1" object. The "Delta1" object receives data from "InputWindow1" object in the format of the "NewSchema" object. Additionally, CCL statement 212 indicates that the primary key for accessing data may be deduced by event processing server 102.

Additionally, a developer may use CCL textual editor 122 to add logic to the CCL statements. Example CCL logic can include example non-limiting control keys such as "in", "out", begin" and "on" statements, to name only a few.

For example, a non-limiting CCL statement such as a CCL statement 214A includes:

```
CREATE FLEX Flex1
    in InputWindow1
    out output window flexwindow101
    SCHEMA NewSchema PRIMARY KEY (COL1)
    BEGIN
        ON InputWindow1
        (
            // do something
        )
    END
);
```

CCL statement 214A creates a "Flex1" object of type FLEX. The "Flex1" object uses "InputWindow1" to input data in the NewSchema object format. After the "Flex1" object manipulates the data, it outputs the manipulated data to the "flexwindow101" object (description not shown.) The "Flex1" object manipulates data using, in a non-limiting example, the "BEGIN END" clause included in CCL statement 214A.

Another example non-limiting CCL statement is CCL statement 216A:

```
CREATE OUTPUT STREAM OutputStream1 SCHEMA NewSchema As
SELECT * FROM InputStream1;
```

CCL statement 216A creates an "OuputStream1" object. The "OutputStream1" object is an output stream that selects data from the "InputStream1" object using the SELECT clause included in CCL statement 216A. The "OutputStream1" object includes data in the "NewSchema" object format as described in CCL statement 216A.

Another example non-limiting CCL statement is CCL statement 218A:

```
ATACH INPUT ADAPTER RandomTupleAdapter TYPE
    randomtuplegen_in TO InputStream1 PROPERTIES Rate = 100;
```

CCL statement 218A attaches an input adapter, such as "RandomTupleAdapter" object, which may be a type of input adapter 104 to the "InputStream1" object. For example, "RandomTupleAdapter" may receive data from an outside source, that is then processed by the CCL statements in FIG. 2A.

Figure 2B:
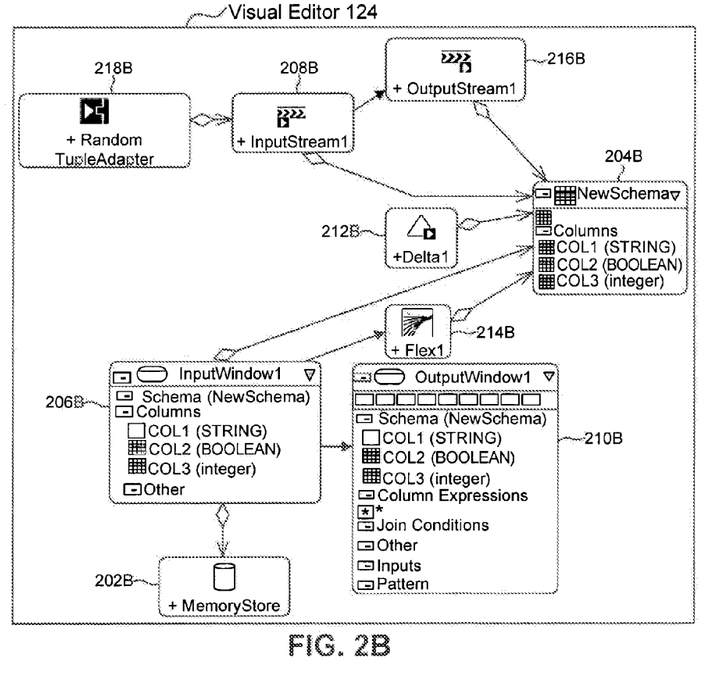
FIG. 2B is a block diagram of an exemplary visual editor.

FIG. 2B is a block diagram 200B of visual editor 124. Visual editor 124 includes a visual representation of objects included in CEP server 101 and manipulated by CCL statements. For example, schema, input data, data stream, window, and input adapter objects described above are represented as nodes in visual editor 124.

Example visual representation of the CCL document described in FIG. 2A is displayed in FIG. 2B. FIG. 2B includes a screen shot from visual editor 124 that includes CCL statements in FIG. 2A. Example nodes in FIG. 2B include a MemoryStore node 202B, a NewSchema node 204B, an InputWindow1 node 206B, an InputStream1 node 208B, an OutputWindow1 node 210B, a Delta1 node 212B, a Flex1 node 214B, an OutputStream1 node 216B and a RandomTupleAdapter node 218B that were defined with the exemplary CCL statements in textual editor 122.

For example, MemoryStore node 202B was created from CCL statement 202A, described above.

In another example, NewSchema node 204B was created from CCL statement 204A, described above.

In another example, InputWindow1 node 206B was created from CCL statement 206A, described above.

In another example, InputStream1 node 208B was created from CCL statement 208A, described above.

In another example, OutputWindow1 node 210B was created from CCL statement 210A, described above.

In another example, Delta1 node 212B was created from CCL statement 212A, described above.

In another example, Flex1 node 214B was created from CCL statement 214A, described above.

In another example, OutputStream1 node 216B was created from CCL statement 216A, described above.

In another example, RandomTupleAdapter node 218B was created from CCL statement 218A, described above.

Each node that is included in visual editor 124 may include a child node. Each node that includes a child node may be referred to as a parent node. Child nodes may include logic that is also included in the CCL statement. When parent nodes include child nodes, visual editor 124 includes a "plus sign" inside the parent node. For example, in FIG. 2B, MemoryStore node 202B, NewSchema node 204B, InputWindow1 node 206B, InputStream1 node 208B, OutputWindow1 node 210B, Delta1 node 212B, Flex1 node 214B, OutputStream1 node 216B and RandomTupleAdapter node 218B include child nodes.

As demonstrated in FIG. B the "plus sign" is expanded in NewSchema node 204B, InputWindow1 node 206B, and OutputWindow1 node 210B, as a non-limiting example.

For example, CCL statement 204A (replicated below):

```
CREATE SCHEMA NewSchema (COL 1 STRING, COL 2
    BOOLEAN, COL3 INTEGER)
``` includes three child nodes for NewSchema node 204B. Each child node 220B corresponds to a data type declaration for a column in CCL statement 204A that generates NewSchema 204 node, such as COL 1 STRING, COL2 BOOLEAN and COL3 INTEGER.

In another example, CCL statement 206A (replicated below):

```
CREATE INPUT WINDOW InputWindow1 SCHEMA
    NewSchema PRIMARY KEY (COL1) STORE MemoryStore
``` includes a child node NewSchema node 204B for InputWindow1 node 206B.

In another example, OutputWindow1 node 210B includes at least three child nodes. For example, OutputWindow1 node 210 includes a child node NewSchema node 220B that corresponds to CCL statement 210A. OutputWindow1 node 210 also includes child node "Column Expression" that corresponds to the SELECT clause in CCL statement 210A.

Visual editor 124 also includes visual representation of connection types between different objects. Example connection types may include a data flow, an inheritance or an aggregation. In a non-limiting embodiment, a data flow is represented as a directed arrow with a filled arrowhead at the target object of a data flow. For example, in FIG. 2B a data flow exists from InputStream1 node 208B to OutputStream1 node 216B and from InputWindow1 node 206B to Flex1 node 214B.

In another embodiment, an inheritance is represented as a directed arrow with an unfilled arrow head at the parent object.

In another embodiment, an aggregation is represented as an unfilled diamond at the source object and a directed plain arrow at the target object that is being aggregated. FIG. 2B displays an example aggregation between RandomTuple-Adapter node 218B and InputStream1 node 208B; Output-Stream1 node 216B and NewSchema node 204B; Delta1 node 212B and NewSchema node 204B; Flex1 node 214B and NewSchema node 204B; and OutputWindow1 node 210B and NewSchema node 204B.

Figure 2C:
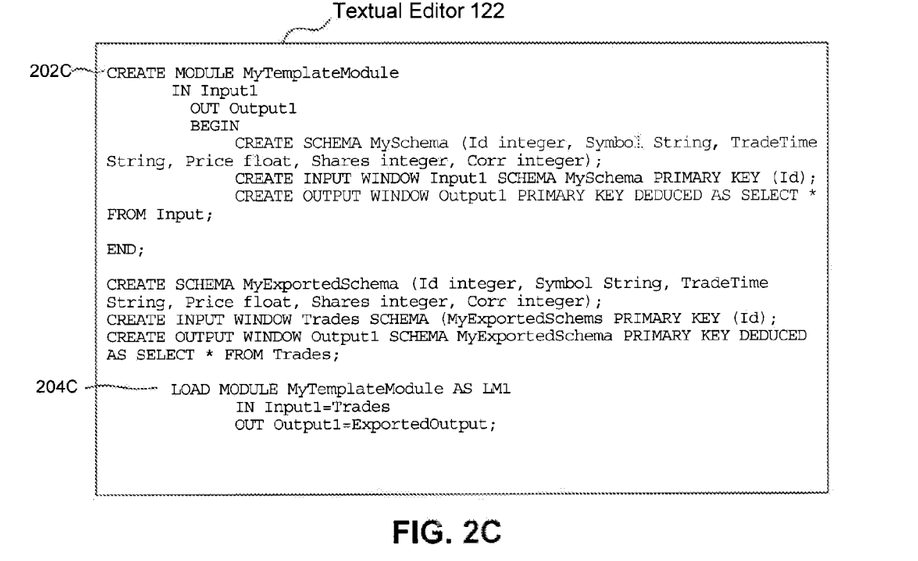
FIG. 2C is a block diagram of an exemplary textual editor that implements a module.

FIG. 2C is a block diagram of an exemplary textual editor that implements a module. A module is a "black box" that manipulates data according to a predefined logic, but whose internal design may be transparent to other application developers. A module is typically connected to a data object, such as a window or a stream that provides input data to the module. The module is also connected to an output object, such as a window or a stream that receives the data that was analyzed and/or modified by the module. Typically, an application developer may declare multiple instances of the same module, where each module instance receives data from different components within event processing server 102, and distributes the analyzed and/or modified data to other components within event processing server 102.

An exemplary non-limiting CCL statement, such as CCL statement 202C replicated below, creates a module object MyTemplateModule and includes an internal logic for the MyTemplateModule object.

```
CREATE MODULE MyTemplateModule
    IN Input1
    OUT Output1
    BEGIN
        CREATE SCHEMA MySchema (Id integer, Symbol String,
        TradeTime String, Price float, Shares integer, Corr integer);
        CREATE INPUT WINDOW Input1 SCHEMA MySchema
        PRIMARY KEY (Id);
        CREATE OUTPUT WINDOW Output1 PRIMARY KEY
        DEDUCED AS SELECT * FROM Input;
    END;
```

The logic included in CCL statement 202C receives input data through "Input1" object and distributes the processed data through "Output1" object." CCL statement 202C also generates three objects that define the internal logic of "MyTemplateModue", such as "MySchema", "Input1" and "Output1."

After a module is created using CCL statement 202C, an instance of the module is created using another example non-limiting CCL statement, such CCL statement 204C, replicated below.

```
LOAD MODULE MyTemplateModule AS LM1
    IN Input1=Trades
    OUT Output1=ExportedOutput;
```

CCL statement 204C creates an instance of the "MyTemplateModule" module as "LM1" object. The "LM1" object created using CCL statement 204C uses an input window "Trades" to input data, and output window "Exported Output" to output the processed data, as described in FIG. 2C. Additionally, other instances of the "MyTemplateModule" may be created using a CCL statement similar to CCL statement 204C that includes a LOAD MODULE control word.

Figure 2D:
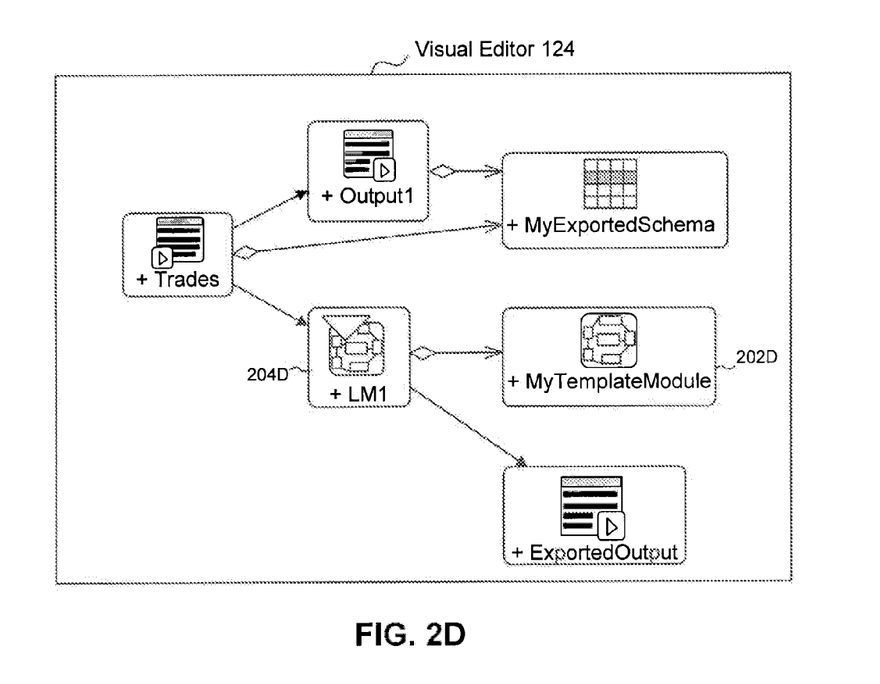
FIG. 2D is a block diagram of an exemplary visual editor that implements a module.

FIG. 2D is a block diagram 200D of an exemplary visual editor that implements a load module. Visual editor 124 implements the objects described in FIG. 2C as a network of nodes connected using multiple arcs. For example, visual editor 124 generates a "MyTemplateModule" node 202D from CCL statement 202C. In another example, visual editor 124 generates an "LM1" node 204D from CCL statement 204C.

Going back to FIG. 1, CEP studio 116 also includes a text-to-visual module 126. Text-to-visual module 126 allows a developer to convert CCL statements from a textual representation in textual editor 122 to a visual representation in visual editor 124. When a developer writes a CCL statement in textual editor 122, the developer may want to see a visual representation of the CCL statement. For example, text-to-visual module 126 translates the CCL statements from a textual representations described in FIG. 2A to a visual representation described in FIG. 2B.

Text-to-visual module 126 generates nodes and arcs in visual editor 124 from the code included in each CCL document. The nodes and arcs form a directed graph that shows the flow of the data through event processing server 102. Each node represents an object and each arc represents a connection type, as described herein. A person skilled in the art will appreciate that directed graphs illustrate the data flow between multiple nodes.

Text-to-visual module 126 begins the translation process by traversing each CCL statement in the CCL document. Text-to-visual module 126 traverses each CCL statement until it identifies an object in the CCL statement. Text-to-visual module 126 identifies the object using keywords. Example key words include Stream, Window, Schema, Adapter, Module, and Flex Operator. Each object corresponds to a node in visual editor 124.

After text-to-visual module identifies a node in visual editor 124, text-to-visual module 126 determines whether any child nodes exist within the identified node. To identify the child nodes, text-to-visual module 124 analyzes each CCL statement and identifies whether the CCL statement includes keywords in a position that may generate a child node.

After text-to-visual module 126 identifies parent and child nodes, if any, in CCL statement, text-to-visual module 126 generates arcs that identify connection types between the nodes. For example, text-to-visual module 126 performs a second iteration through the CCL statements included in the CCL document. As text-to-visual module 126 evaluates each CCL statement, it determines the node that is a source object, the node that is a target object, and a connection type between the nodes based on the semantics in each CCL statement.

Example Table 1 below is a non-limiting example of a source object type, target object type and CCL statement semantics that indicate to text-to-visual module 126 a particular connection type.

TABLE 1

| Source Object Type | Target Object Type | CCL Statement Semantics | Connection Type |
|---|---|---|---|
| Stream or Window | Stream | Select stmt FROM clause | Data-flow |
| Stream or Window | Window | Select stmt FROM clause | Data-flow |
| Stream or Window | Flex Operator | INPUTS (to Flex) | Data-flow |
| Schema | Schema | INHERITS from reference Schema | inheritance |
| Stream or Window | Schema | Schema reference | aggregation |
| Stream or Window | Store | STORE reference | aggregation |
| Adapter | Stream or Window | ATTACH ADAPTER stream reference | aggregation |
| Load Module | Module | Module reference | aggregation |
| Load Module Export | Stream or Window | Load Module output binding | Data-flow |
| Stream or Window | Load Module | Load Module input binding | Data-flow |

For example, the Table 1 above demonstrates that when a source object is a stream, a target object is a stream and a CCL statement includes a select clause, text-to-visual module 126 generates a connection type that is data-flow. The data flow arrow begins at the source object and ends at the target object.

In another example, when a source object is a schema, a target object is a schema and a CCL statement includes an inherit clause, text-to-visual module 126 generates a connection type that is an inheritance. The inheritance arrow begins at the source object and ends at the target object.

In another example, when a source object is an adapter, a target object is a stream and a CCL statement includes an attach adapter clause, text-to-visual module 126 generates a connection type that is an aggregation. The aggregation arrow begins at the source object and ends at the target object.

In another example, when a source object is a load module, a target object is a module, and a CCL statement includes a reference to a module, text-to-visual module 126 generates a connection type that is an aggregation. The aggregation arrow begins at the source object and ends at the target object.

In another example, when a source object is an adapter, a target object is a stream and a CCL statement includes an attach adapter clause, text-to-visual module 126 generates a connection type that is an aggregation. The aggregation arrow begins at the source object and ends at the target object.

Figure 3:
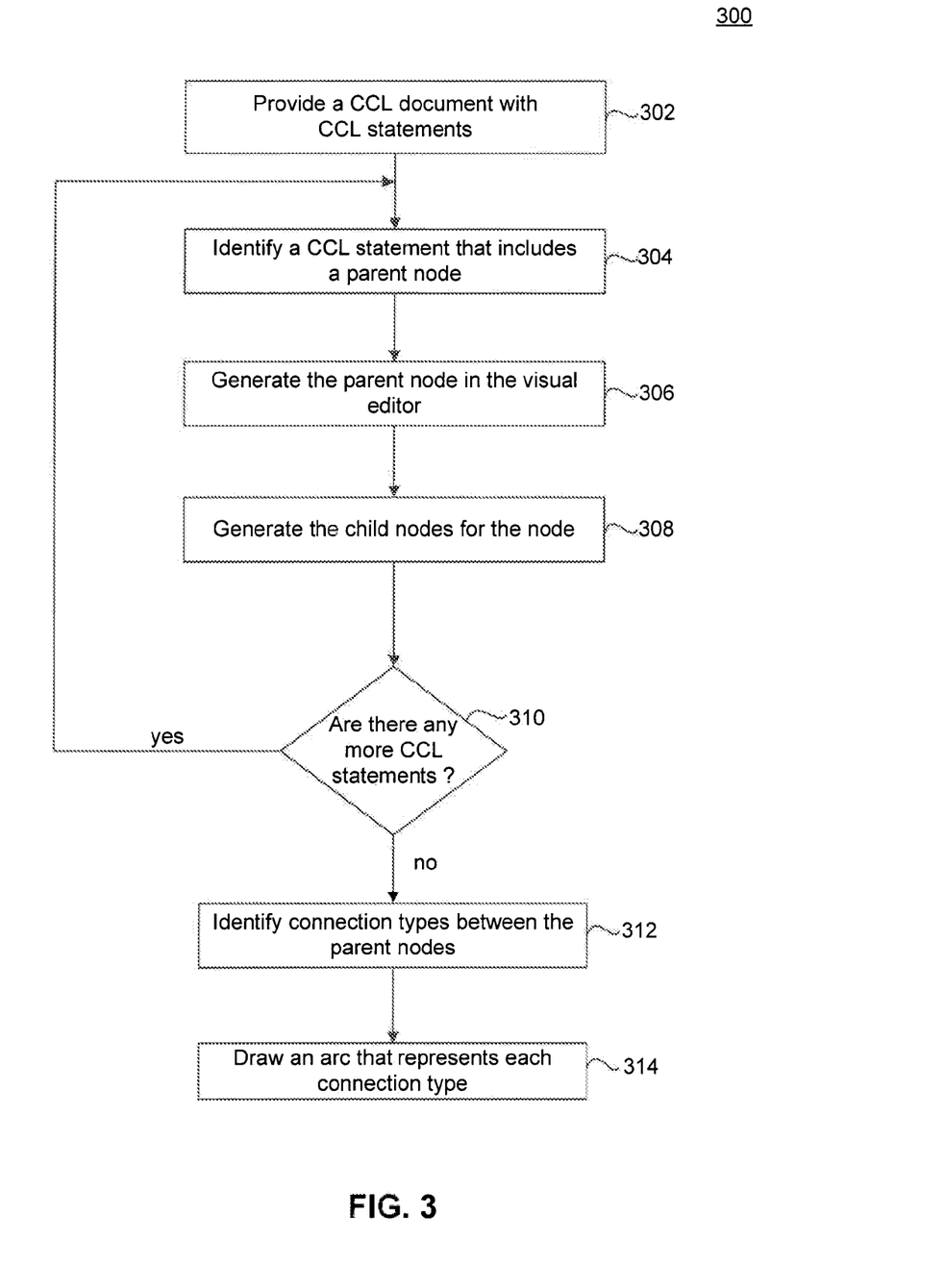
FIG. 3 is a flowchart of a method for generating a visual representation of the objects included in a CCL document, according to an embodiment.

FIG. 3 is a flowchart of an exemplary method 300 for generating a visual representation of the nodes from a textual CCL document, according to an embodiment.

At step 302, a CCL document is provided. For example, a developer types one or more CCL statements in textual editor 122 and saves the CCL statements as a CCL document. In another example, developer may retrieve a CCL document from a memory of a computing device that hosts CEP studio 116, or uploads a CCL document into CEP studio 116.

At step 304, a node in each CCL statement is identified. For example, text-to-visual module 126 identifies a stream, a window, a schema, an adapter or a module objects in the CCL statement using a particular keyword for each object.

At step 306, a node from the identified CCL statement in step 304 is generated. For example, text-to-visual module 126 generates a visual object from each node identified in step 304.

At step 308, a child node is identified and created. For example, text-to-visual module 126 identifies whether the node in step 306 has child nodes and generates the child nodes in visual editor 124. As described herein, child nodes represent logic included in the CCL statement.

At step 310, text-to-visual module 126 determines whether there are more CCL statements included in the CCL document. If there are more CCL statements included in the CCL document the method proceeds to step 304 and text-to-visual module 126 processes another CCL statement. Otherwise, the method proceeds to step 312.

At step 312, text-to-visual module 126 identifies the connection types between the objects. For example, text-to-visual module 126 identifies the connection type based on the source and target objects and the semantics included in each CCL statement included in the CCL document.

At step 314, text-to-visual module 126 generates an arc that represents a connection type. The arc may begin at one node that represents an object and terminate at a second node that represents a same or different object. As described herein, a connection type may be a data flow, an inheritance or an aggregation.

After step 314, visual editor 124 contains a visual representation of the CCL document as described in text editor 122.

Updating a Visual Representation of the CCL Document

Text-to-visual module 126 may modify the visual representation of the CCL document when the CCL document changes. For example, a developer may modify an existing CCL statement in the CCL document or add a new CCL statement. When text-to-visual module 126 determines that a CCL statement was modified or a new CCL statement was added, text-to-visual module 126 modifies the visual representation of the CCL document in visual editor 124.

For example, text-to-visual module 126 scans the CCL document for a modified CCL statement and/or a new CCL statement. When text-to-visual module 126 identifies a modified CCL statement, text-to-visual module 126 determines whether changes are needed to the node that represents an object in the CCL statement. When text-to-visual module 126 identifies a new CCL statement, text-to-visual module scans the new CCL statement for a keyword that indicates a node. If a keyword is found, text-to-visual module 126 generates a node. Text-to-visual module 126 then determines whether to generate any child nodes, and generates child node, if any. Text-to-visual module 126 also determines whether to update or generate any arcs that represent connection types for the new or updated CCL statement.

Figure 4:
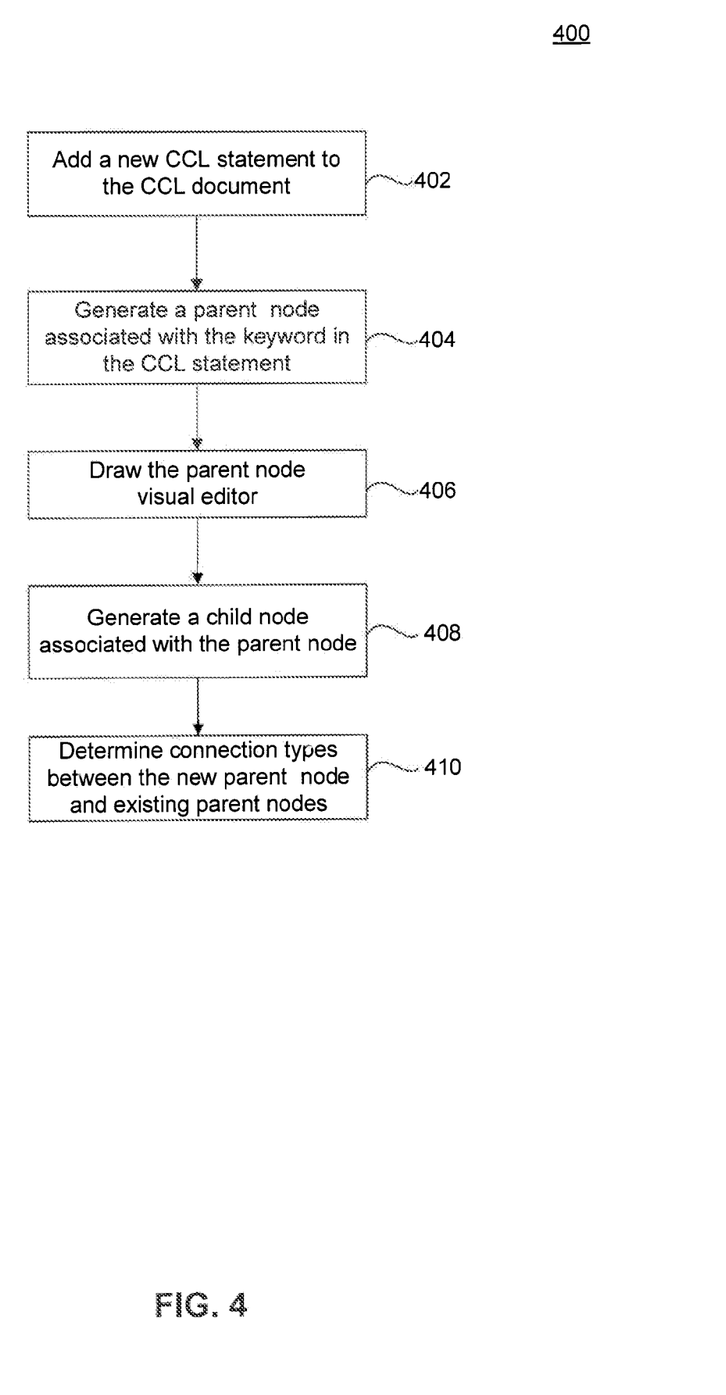
FIG. 4 is a flowchart of a method for updating a visual representation from an updated CCL document, according to an embodiment.

FIG. 4 is a flowchart of an exemplar method 400 for updating a visual editor with a modified CCL document.

At step 402, a textual editor receives an indication to add a new CCL statement. For example, textual editor 122 receives an action from a developer to add a CCL statement that includes a new data stream, window or a schema.

At step 404, text-to-visual module 126 creates a node associated with a new CCL statement.

At step 406, text-to-visual module 126 draws the parent node identified at step 404 in visual editor 124.

At step 408, text-to-visual module 126 identifies and generates a child node for the new node.

At step 410, text-to-visual module 126 determines connection type between the parent node created in step 404 and existing parent nodes.

Computer System

Figure 5:
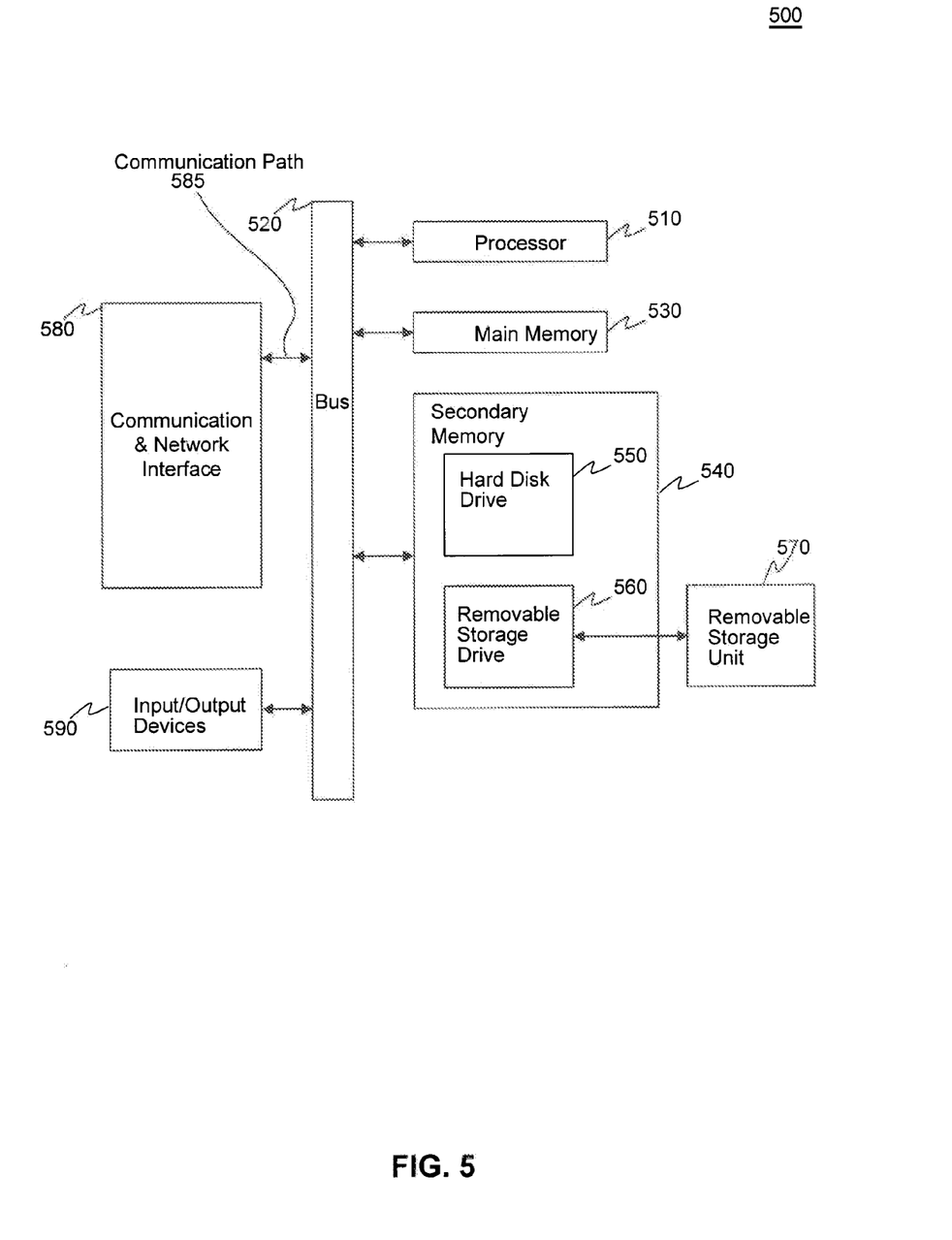
FIG. 5 is a block diagram of a computer system in which embodiments of the present invention can be implemented.

Various aspects of the invention can be implemented by software, firmware, hardware, or a combination thereof. FIG. 5 illustrates an example computer system 500 in which the invention, or portions thereof, can be implemented as computer-readable code. For example, the methods illustrated by flowcharts described herein can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 510. Processor 510 can be a special purpose or a general purpose processor. Processor 510 is connected to a communication infrastructure 520 (for example, a bus or network).

Computer system 500 also includes a main memory 530, preferably random access memory (RAM), and may also include a secondary memory 540. Secondary memory 540 may include, for example, a hard disk drive 550, a removable storage drive 560, and/or a memory stick. Removable storage drive 560 may comprise a floppy disk drive, a magnetic tape drive, an optical disk drive, a flash memory, or the like. The removable storage drive 560 reads from and/or writes to a removable storage unit 570 in a well known manner. Removable storage unit 570 may comprise a floppy disk, magnetic tape, optical disk, etc. which is read by, and written to, by removable storage drive 560. As will be appreciated by persons skilled in the relevant art(s), removable storage unit 570 includes a computer-usable storage medium having stored therein computer software and/or data.

In alternative implementations, secondary memory 540 may include other similar means for allowing computer programs or other instructions to be loaded into computer system 500. Such means may include, for example, a removable storage unit 570 and an interface (not shown). Examples of such means may include a program cartridge and cartridge interface (such as that found in video game devices), a removable memory chip (such as an EPROM, or PROM) and associated socket, and other removable storage units 570 and interfaces which allow software and data to be transferred from the removable storage unit 570 to computer system 500.

Computer system 500 may also include a communications and network interface 580. Communication and network interface 580 allows software and data to be transferred between computer system 500 and external devices. Communication and network interface 580 may include a modem, a communications port, a PCMCIA slot and card, or the like. Software and data transferred via communication and network interface 580 are in the form of signals which may be electronic, electromagnetic, optical, or other signals capable of being received by communication and network interface 580. These signals are provided to communication and network interface 580 via a communication path 585. Communication path 585 carries signals and may be implemented using wire or cable, fiber optics, a phone line, a cellular phone link, an RF link or other communications channels.

The communication and network interface 580 allows the computer system 500 to communicate over communication networks or mediums such as LANs, WANs the Internet, etc. The communication and network interface 580 may interface with remote sites or networks via wired or wireless connections.

In this document, the terms "computer program medium" and "computer-usable medium" and "computer-readable medium" are used to generally refer to media such as removable storage unit 570, removable storage drive 560, and a hard disk installed in hard disk drive 550. Signals carried over communication path 585 can also embody the logic described herein. "Computer program medium" and "computer-usable medium" can also refer to memories, such as main memory 530 and secondary memory 540, which can be memory semiconductors (e.g. DRAMs, etc.). These computer program products are means for providing software to computer system 500.

Computer programs (also called computer control logic) are stored in main memory 530 and/or secondary memory 540. Computer programs may also be received via communication and network interface 580. Such computer programs, when executed, enable computer system 500 to implement embodiments of the invention as discussed herein. In particular, the computer programs, when executed, enable processor 510 to implement the processes of the invention, such as the steps in the methods illustrated by flowcharts discussed above. Accordingly, such computer programs represent controllers of the computer system 500. Where the invention is implemented using software, the software may be stored in a computer program product and loaded into computer system 500 using removable storage drive 560, interfaces, hard drive 550 or communication and network interface 580, for example.

The computer system 500 may also include input/output/display devices 590, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A computer-implemented method for generating a visual representation of a continuous computation language (CCL) document, comprising:
    accessing the CCL document, the CCL document including one or more CCL statements, wherein the one or more CCL statements include instruction logic that when executed by one or more processors manipulates real-time data;
    converting the one or more CCL statements to visual objects as a representation of instruction logic of the CCL document graphically on a display device, wherein the converting further comprises:
    for each CCL statement, generating a plurality of parent nodes based on CCL statement keywords;
    identifying different connection types between the plurality of parent nodes, wherein the connection types are based on semantics between the plurality of parent nodes; and
    drawing different connections between the plurality of parent nodes based on the different connection types;
    determining a number of instructions in each CCL statement that generated a parent node in the plurality of parent nodes; and
    based on the number of instructions, generating child nodes for the parent node, one child node per instruction in each CCL statement.

2. The computer-implemented method of claim 1, wherein the plurality of parent nodes and the different connections represent the instruction logic included in the CCL document.

3. The computer-implemented method of claim 1, wherein a parent node represents a schema.

4. The computer-implemented method of claim 1, wherein a parent node represents a stream.

5. The computer-implemented method of claim 1, wherein a parent node represents a window.

6. The computer-implemented method of claim 1, wherein a parent node represents a store.

7. The computer-implemented method of claim 1, wherein a parent node represents a module, the module including logic that when executed by one or more processors manipulates the real-time data.

8. The computer-implemented method of claim 7, wherein the logic that manipulates the real-time data further comprises at least one CCL statement that represents at least one parent node within the module.

9. The computer-implemented method of claim 1, further comprising:
    identifying a new CCL statement, wherein the new CCL statement includes a new keyword;
    generating a new parent node from the new keyword in the new CCL statement;
    drawing the new parent node in a visual editor;
    generating at least one new child node for the new parent node;
    determining at least one new connection type between the new parent node and the plurality of parent nodes; and
    drawing at least one new connection between the new parent node and the plurality of parent nodes.

10. The computer-implemented method of claim 1, wherein the one or more connections represent a data flow.

11. The computer-implemented method of claim 1, wherein the one or more connections represent an aggregation.

12. A system for generating a visual representation of a continuous computation language (CCL) document, comprising:
    one or more processors;
    one or more memories coupled to the one or more processors;
    the CCL document being stored in the one or more memories and comprising one or more CCL statements;
    a text-to-visual mapping module being stored in the one or more memories and executing on the one or more processors and configured to convert the CCL statements to visual objects as a representation of instruction logic of the CCL document graphically on a display device, wherein to convert the CCL statements the text-to-visual mapping module is further configured to:
    for each CCL statement generate a plurality of parent nodes based on CCL statement keywords;
    identify different connection types between the plurality of parent nodes, wherein the connection types are based on semantics between the plurality of parent nodes; and
    draw the different connections between the plurality of parent nodes based on the different connection types; and
    the text-to-visual mapping module is further configured to:
    determine a number of instructions in each CCL statement that generated a parent node in the plurality of parent nodes; and
    based on the number of instructions, generate child nodes for the parent node, one child node per instruction in each CCL statement.

13. The system of claim 12, wherein the plurality of parent nodes and the different connections represent the instruction logic included in the CCL document.

14. The system of claim 12, wherein a parent node represents a schema.

15. The system of claim 12, wherein a parent node represents a stream.

16. The system of claim 12, wherein a parent node represents a window.

17. The system of claim 12, wherein a parent node represents a module, the module including logic that manipulates data.

18. An article of manufacture including a non-transitory computer-readable medium having instructions stored thereon that, when executed by a computing device, cause the computing device to perform operations for generating a visual representation of a continuous computation language (CCL) document, the operations comprising:
    accessing the CCL document, the CCL document including one or more CCL statements, wherein the one or more CCL statements include instruction logic that manipulates real-time data;
    converting the one or more CCL statements to visual objects as a representation of instruction logic of the CCL document graphically on a display device, wherein the converting further comprises:

for each CCL statement generating a plurality of parent nodes based on CCL statement keywords;

identifying different connection types between the plurality of parent nodes, wherein the connection types are based on the semantics between the plurality of parent nodes; and drawing different connections between the plurality of parent nodes based on the different connection types;

determining a number of instructions in each CCL statement that generated a parent node in the plurality of parent nodes; and based on the number of instructions, generating child nodes for the parent node, one child node per instruction in each CCL statement.

* * * * *